US012677242B2

(12) United States Patent
Barbu et al.

(10) Patent No.: US 12,677,242 B2
(45) Date of Patent: Jul. 7, 2026

(54) POSITIONING OF TERMINAL DEVICES

(71) Applicant: Nokia Technologies Oy, Espoo (FI)

(72) Inventors: Oana-Elena Barbu, Aalborg (DK);
Benny Vejlgaard, Aalborg (DK);
Johannes Harrebek, Aalborg (DK);
Daejung Yoon, Nozay (FR)

(73) Assignee: Nokia Technologies Oy, Espoo (FI)

( * ) Notice: Subject to any disclaimer, the term of this
patent is extended or adjusted under 35
U.S.C. 154(b) by 303 days.

(21) Appl. No.: 18/560,862

(22) PCT Filed: May 25, 2021

(86) PCT No.: PCT/EP2021/063888
§ 371 (c)(1),
(2) Date: Nov. 14, 2023

(87) PCT Pub. No.: WO2022/248019
PCT Pub. Date: Dec. 1, 2022

(65) Prior Publication Data
US 2024/0251377 A1 Jul. 25, 2024

(51) Int. Cl.
*H04W 64/00* (2009.01)
(52) U.S. Cl.
CPC .................................. *H04W 64/00* (2013.01)
(58) Field of Classification Search
CPC ..................................................... H04W 64/00
USPC ........................................................ 455/456.1
See application file for complete search history.

(56) References Cited

U.S. PATENT DOCUMENTS

| | | | | |
|---|---|---|---|---|
| 2018/0343635 A1* | 11/2018 | Edge | ..................... | H04W 64/00 |
| 2019/0327706 A1* | 10/2019 | Agnihotri | ............. | H04W 24/10 |
| 2019/0327707 A1 | 10/2019 | Agnihotri et al. | | |
| 2019/0342705 A1 | 11/2019 | Tian et al. | | |
| 2020/0028583 A1 | 1/2020 | Radulescu et al. | | |

(Continued)

FOREIGN PATENT DOCUMENTS

WO 2021/006796 A1 1/2021

OTHER PUBLICATIONS

"3rd Generation Partnership Project; Technical Specification Group
Radio Access Network; NR; Radio Resource Control (RRC) pro-
tocol specification (Release 16)", 3GPP TS 38.331, V16.3.1, Jan.
2021, pp. 1-932.

(Continued)

*Primary Examiner* — Michael R Neff
(74) *Attorney, Agent, or Firm* — Lippes Mathias LLP

(57) ABSTRACT

To position a terminal device, at least one transmission-
reception point, or corresponding apparatus, the terminal
device and a network entity exchange information. A trans-
mission-reception point receives from the network entity a
first signal comprising at least one parameter setting for
positioning reference signal transmissions. The terminal
device receives from the network entity a second signal
comprising at least the parameter setting. The network entity
receives from the transmission-reception point a first report
indicating at least an occurrence time of a successful trans-
mission of a positioning reference signal and from the
terminal device a measurement report comprising informa-
tion on at least the positioning reference signal. The network
entity determines a position of the terminal device based on
at least the first report and the measurement report.

18 Claims, 4 Drawing Sheets

(56) References Cited

U.S. PATENT DOCUMENTS

| | | |
|---|---|---|
| 2020/0229126 A1 | 7/2020 | Soriaga et al. |
| 2020/0264261 A1 | 8/2020 | Akkarakaran et al. |
| 2020/0267681 A1 | 8/2020 | Ferrari et al. |
| 2020/0344712 A1 | 10/2020 | Akkarakaran et al. |
| 2021/0067382 A1 | 3/2021 | Manolakos et al. |
| 2021/0112520 A1 | 4/2021 | Yerramalli et al. |

OTHER PUBLICATIONS

"3rd Generation Partnership Project; Technical Specification Group Radio Access Network; NR; Physical layer procedures for data (Release 16)", 3GPP TS 38.214, V16.4.0, Dec. 2020, pp. 1-169.

"New WID on NR Positioning Enhancements", 3GPP TSG RAN Meeting #90e, RP-202900, Agenda Item: 9.1.1, CATT, Dec. 7-11, 2020, 5 pages.

"Revised WID on NR-based Access to Unlicensed Spectrum", 3GPP TSG RAN Meeting #86, RP-1912926, Agenda Item: 9.4.3, Qualcomm Inc, Dec. 9-12, 2019, 8 pages.

"3rd Generation Partnership Project; Technical Specification Group Radio Access Network; Physical layer procedures for shared spectrum channel access (Release 16)", 3GPP TS 37.213, V16.4.0, Dec. 2020, pp. 1-26.

"5G; NG Radio Access Network (NG-RAN); Stage 2 functional specification of User Equipment (UE) positioning in NG-RAN (3GPP TS 38.305 version 15.0.0 Release 15)", ETSI TS 138 305, V15.0.0, Sep. 2018, 57 pages.

International Search Report and Written Opinion received for corresponding Patent Cooperation Treaty Application No. PCT/EP2021/063888, dated Feb. 22, 2022, 12 pages.

* cited by examiner transmit to TRP(s) first signal comprising par.set for PRS(s) ~ 301 transmit to TD second signal comprising par.set. for PRS(s) ~ 302 receive from TRP(s) first report(s) with time info ~ 303 receive from TD measurement report with PRS info ~ 304 determine, based on reports, position of TD ~ 305

POSITIONING OF TERMINAL DEVICES

RELATED APPLICATION

This application was originally filed as PCT Application No. PCT/EP2021/063888 on 25 May 2021, which is incorporated herein by reference in its entirety.

TECHNICAL FIELD

Various example embodiments relate to wireless communications.

BACKGROUND

Wireless communication systems are under constant development. New applications, use cases and industry verticals are to be envisaged with different positioning performance requirements.

BRIEF DESCRIPTION

According to an aspect there is provided an apparatus, the apparatus comprising at least one processor; and at least one memory including computer program code, the at least one memory and computer program code configured to, with the at least one processor, cause the apparatus at least to perform: transmitting to a transmission-reception point of at least one transmission-reception point a first signal comprising a parameter setting for one or more positioning reference signal transmissions; transmitting to a terminal device a second signal comprising at least the parameter setting; receiving, from the transmission-reception point, a first report comprising at least an occurrence time of a successful transmission of a positioning reference signal from the transmission-reception point; receiving, from the terminal device, a measurement report comprising information on at least the positioning reference signal; and determining, based on at least the first report and the measurement report, a position of the terminal device.

In an embodiment, the at least one memory and computer program code configured to, with the at least one processor, cause the apparatus further at least to perform: indicating in the first signal, that a contention based access is to be used for the one or more positioning reference signal transmissions, and a retransmission timeout value for the contention based access; and indicating in the second signal a length of a time period to listen to at least the one or more positioning reference signal transmissions.

In embodiments, the at least one memory and computer program code configured to, with the at least one processor, cause the apparatus further at least to perform: selecting amongst a plurality of transmission-reception points a set of transmission-reception points; assigning a parameter setting per a selected transmission-reception point in the set of transmission reception points; transmitting, per the selected transmission-reception point, to the selected transmission-reception point, in the first signal the parameter setting assigned as the parameter setting for one or more positioning reference signal transmissions; and transmitting in the second signal, to the terminal device, the parameter settings assigned to the set of transmission-selection points selected.

In embodiments, the at least one memory and computer program code configured to, with the at least one processor, cause the apparatus further at least to perform: selecting amongst a plurality of transmission-reception points a set of transmission-reception points; transmitting, per the selected transmission-reception point, to the transmission-reception point, in the first signal, a common resource pool comprising a plurality of parameter settings including the parameter setting; and transmitting in the second signal, to the terminal device, the common resource pool.

In an embodiment, the at least one memory and computer program code configured to, with the at least one processor, cause the apparatus further at least to perform: determining, based on at least one discovery reference signal configuration received from the at least one transmission-reception point, resource allocation for the one or more positioning reference signal transmissions, wherein a discovery reference signal configuration received indicates a discovery signaling period and wherein the resource allocation at least indicates how many discovery signaling periods a periodicity of the one or more positioning reference signal transmissions is; transmitting in the first signal the resource allocation; and transmitting in the second signal information indicating the resource allocation.

According to an aspect there is provided an apparatus configured to act as a transmission-reception point, the apparatus comprising at least one processor; and at least one memory including computer program code, the at least one memory and computer program code configured to, with the at least one processor, cause the apparatus at least to perform: receiving, from a network entity, a first signal comprising a parameter setting for one or more positioning reference signal transmissions; transmitting at least one positioning reference signal using the parameter setting received; and transmitting to the network entity, in response to a successful transmission of a positioning reference signal, a first report comprising at least an occurrence time of the successful transmission of the positioning reference signal.

In an embodiment, the at least one memory and computer program code configured to, with the at least one processor, cause the apparatus further at least to perform: selecting the parameter setting for the one or more positioning reference signal transmissions from a common resource pool comprising a plurality of parameter settings, the common resource pool being received in the first signal; and using the parameter setting selected as the parameter setting received when transmitting the at least one positioning reference signal.

In embodiments, the at least one memory and computer program code configured to, with the at least one processor, cause the apparatus further at least to perform: using a contention based access to transmit the at least one positioning reference signal; and repeating, in response to an unsuccessful positioning reference signal transmission, transmitting the at least one positioning reference signal using the parameter setting received until the number of transmissions meets a retransmission timeout value received in the first signal or a transmission succeeds, whichever occurs first.

In an embodiment, the at least one memory and computer program code configured to, with the at least one processor, cause the apparatus further at least to perform: transmitting information on a discovery reference signal configuration to the network entity for obtaining scheduling information for the at least one positioning reference signal; receiving in the first signal also information on a resource allocation as the scheduling information; and transmitting the at least one positioning reference signal according to the received resource allocation.

In embodiments, the first signal and the first report are signals according to a new radio positioning protocol annex.

According to an aspect there is provided an apparatus configured to act as a terminal device, the apparatus comprising at least one processor; and at least one memory including computer program code, the at least one memory and computer program code configured to, with the at least one processor, cause the apparatus at least to perform: receiving from a network entity at least a second signal comprising at least one parameter setting for one or more positioning reference signal transmissions from at least one transmission-reception point; monitoring the one or more positioning reference signal transmissions; and transmitting to the network entity a measurement report comprising information on at least one positioning reference signal received by the terminal device from the one or more positioning reference signal transmissions.

In an embodiment, the at least one memory and computer program code configured to, with the at least one processor, cause the apparatus further at least to perform: monitoring, in response to the second signal comprising an observation time value, the one or more positioning reference signal transmissions during a time period having a length corresponding to the observation time value.

In an embodiment, the at least one memory and computer program code configured to, with the at least one processor, cause the apparatus further at least to perform: monitoring, in response to a common resource pool comprising a plurality of parameter settings being received in the second signal as the parameter setting for the one or more positioning reference signal transmissions, which of the parameter settings in the common resource pools are detected by receiving, per a detected parameter setting, a corresponding positioning reference signal; and transmitting in the measurement report, as the information on one or more positioning reference signals received by the terminal device, information on one or more detected parameter settings.

In an embodiment, the at least one memory and computer program code configured to, with the at least one processor, cause the apparatus further at least to perform: receiving in the second signal also scheduling information for monitoring; and performing the monitoring according to the scheduling information.

In embodiments, the second signal is a signal according to a long term evolution positioning protocol.

In embodiments, the parameter setting for one or more positioning reference signal transmissions comprises a sequence identifier and/or a frequency pattern of the positioning reference signal and/or a positioning reference pattern in time and/or a periodicity of the positioning reference signal and/or a spatial pattern.

According to an aspect there is provided a method for a network entity, the method comprising: transmitting to a transmission-reception point of at least one transmission-reception point a first signal comprising a parameter setting for one or more positioning reference signal transmissions; transmitting to a terminal device a second signal comprising the parameter setting; receiving from the transmission-reception a first report comprising at least an occurrence time of a successful transmission of the positioning reference signal from the transmission-reception point; receiving from the terminal device a measurement report comprising information on at least the positioning reference signal; and determining, based on at least the first report and the measurement report, a position of the terminal device.

According to an aspect there is provided a method for a transmission-reception point, the method comprising: receiving from a network entity a first signal comprising a parameter setting for one or more positioning reference signal transmissions; transmitting at least one positioning reference signal using the parameter setting received; and transmitting to the network entity, in response to a successful transmission of a positioning reference signal, a first report comprising at least an occurrence time of the successful transmission of the positioning reference signal.

According to an aspect there is provided a method for a terminal device, the method comprising: receiving from a network entity at least a second signal comprising at least one parameter setting for one or more positioning reference signal transmissions from at least one transmission-reception point; monitoring the one or more positioning reference signal transmissions; and transmitting to the network entity a measurement report comprising information on at least one positioning reference signal received by the terminal device from the one or more positioning reference signal transmissions.

According to an aspect there is provided a computer-readable medium comprising program instructions, which, when run by a first apparatus, cause the first apparatus to carry out at least: transmitting to a second apparatus of at least one second apparatus a first signal comprising a parameter setting for one or more positioning reference signal transmissions; transmitting to a third apparatus a second signal comprising the parameter setting; receiving at least from the second apparatus a first report comprising at least an occurrence time of a successful transmission of a positioning reference signal from the second apparatus; receiving from the third apparatus a measurement report comprising information on at least the positioning reference signal; and determining, based on at least the first report and the measurement report, a position of the third apparatus.

According to an aspect there is provided a computer-readable medium comprising program instructions, which, when run by a second apparatus, cause the second apparatus to carry out at least: receiving from a first apparatus a first signal comprising a parameter setting for one or more positioning reference signal transmissions; transmitting at least one positioning reference signal using the parameter setting received; and transmitting to the first apparatus, in response to a successful transmission of a positioning reference signal, a first report comprising at least an occurrence time of the successful transmission of the positioning reference signal.

According to an aspect there is provided a computer-readable medium comprising program instructions, which, when run by a third apparatus, cause the third apparatus to carry out at least: receiving from a first apparatus at least a second signal comprising at least one parameter setting for one or more positioning reference signal transmissions from at least one second apparatus; monitoring the one or more positioning reference signal transmissions; and transmitting to the first apparatus a measurement report comprising information on at least one positioning reference signal received by the third apparatus from the one or more positioning reference signal transmissions.

In embodiments, the computer readable medium is a non-transitory computer readable medium.

According to an aspect there is provided a non-transitory computer-readable medium comprising program instructions, which, when run by a first apparatus, cause the first apparatus to carry out at least: transmitting to a second apparatus of at least one second apparatus a first signal comprising a parameter setting for one or more positioning reference signal transmissions; transmitting to a third apparatus a second signal comprising the parameter setting; receiving at least from the second apparatus a first report comprising at least an occurrence time of a successful transmission of a positioning reference signal from the second apparatus; receiving from the third apparatus a measurement report comprising information on at least the positioning reference signal; and determining, based on at least the first report and the measurement report, a position of the third apparatus.

According to an aspect there is provided a non-transitory computer-readable medium comprising program instructions, which, when run by a second apparatus, cause the second apparatus to carry out at least: receiving from a first apparatus a first signal comprising a parameter setting for one or more positioning reference signal transmissions; transmitting at least one positioning reference signal using the parameter setting received; and transmitting to the first apparatus, in response to a successful transmission of a positioning reference signal, a first report comprising at least an occurrence time of the successful transmission of the positioning reference signal.

According to an aspect there is provided a non-transitory computer-readable medium comprising program instructions, which, when run by a third apparatus, cause the third apparatus to carry out at least: receiving from a first apparatus at least a second signal comprising at least one parameter setting for one or more positioning reference signal transmissions from at least one second apparatus; monitoring the one or more positioning reference signal transmissions; and transmitting to the first apparatus a measurement report comprising information on at least one positioning reference signal received by the third apparatus from the one or more positioning reference signal transmissions.

According to an aspect there is provided a computer program comprising instructions which, when the program is executed by a first apparatus, cause the first apparatus to carry out at least: transmitting to a second apparatus of at least one second apparatus a first signal comprising a parameter setting for one or more positioning reference signal transmissions; transmitting to a third apparatus a second signal comprising the parameter setting; receiving from the second apparatus a first report comprising at least an occurrence time of a successful transmission of a positioning reference signal from the second apparatus; receiving from the third apparatus a measurement report comprising information on at least the positioning reference signal; and determining, based on at least the first report and the measurement report, a position of the third apparatus.

According to an aspect there is provided a computer program comprising instructions which, when the program is executed by a second apparatus, cause the second apparatus to carry out at least: receiving from a first apparatus a first signal comprising a parameter setting for one or more positioning reference signal transmissions; transmitting at least one positioning reference signal using the parameter setting received; and transmitting to the first apparatus, in response to a successful transmission of a positioning reference signal, a first report comprising at least an occurrence time of the successful transmission of the positioning reference signal.

According to an aspect there is provided a computer program comprising instructions which, when the program is executed by a third apparatus, cause the third apparatus to carry out at least: receiving from a first apparatus at least a second signal comprising at least one parameter setting for one or more positioning reference signal transmissions from at least one second apparatus; monitoring the one or more positioning reference signal transmissions; and transmitting to the first apparatus a measurement report comprising information on at least one positioning reference signal received by the third apparatus from the one or more positioning reference signal transmissions.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first signal could be termed a second signal, and similarly, a second signal could be also termed a first signal without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), longterm evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
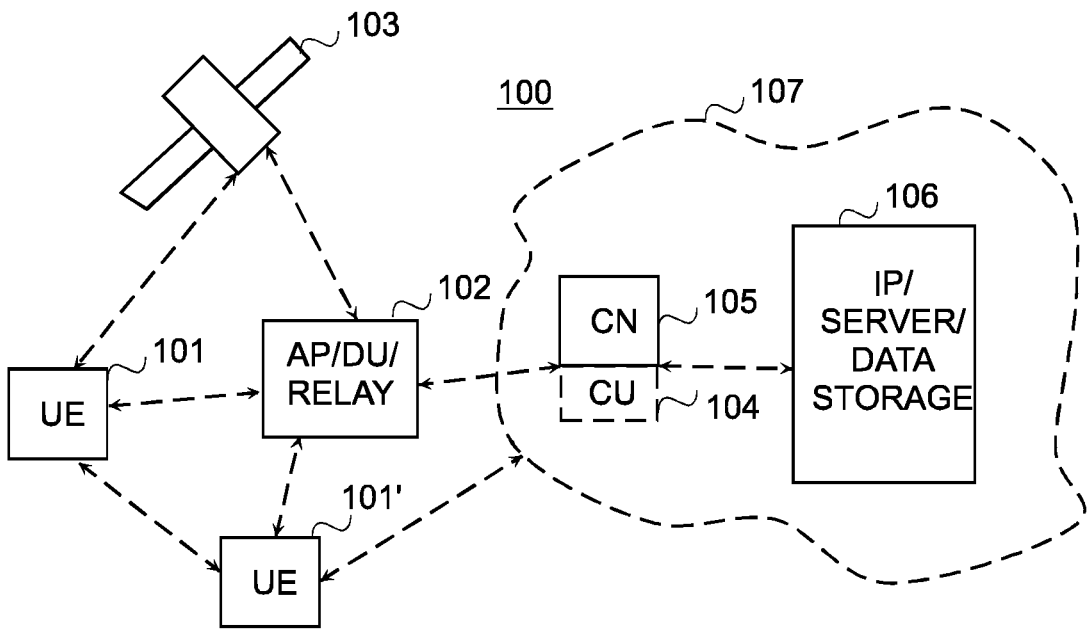
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus.

The user device typically refers to a portable computing device that includes wireless mobile communication devices operating with a subscription entity, for example a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, wearable device, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular megaconstellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more integrated access and backhaul (IAB) nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In 5G and beyond, it is envisaged that use of smart devices, that may move, will increase thereby posing different latency and accuracy requirements for positioning the smart devices in connected robotics and autonomous systems, for example. A non-limiting list of examples of such mobile smart devices include unmanned mobility with fully autonomous connected vehicles, other vehicle-to-everything (V2X) services, or smart industry with different Industrial Internet of Things (IIoT) devices, such as automated guided vehicles or mobile robots or mobile robot arms. Naturally, for positioning of other user devices, like smart phones or wearable devices, including different accessories, different latency and accuracy requirements for positioning them may also be posed.

Figure 2:
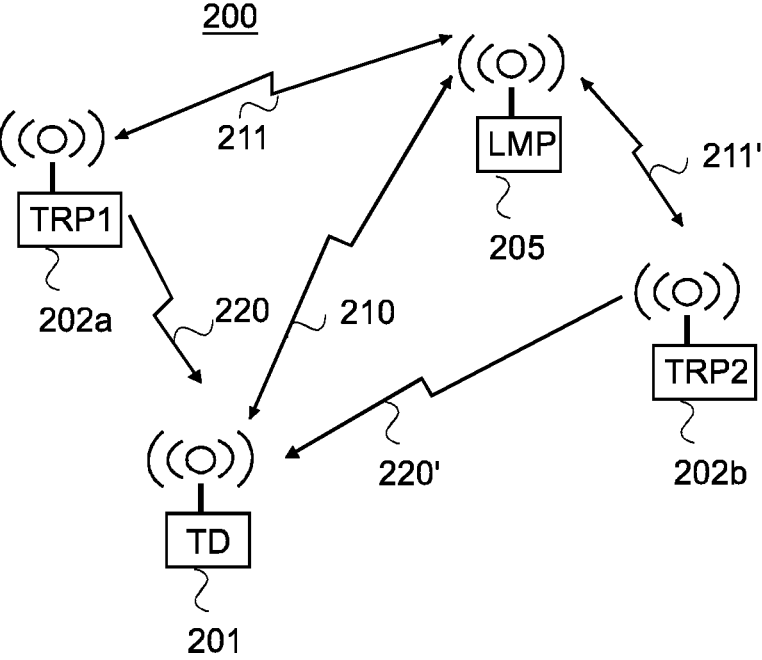
FIG. 2 illustrates an exemplified positioning architecture.

FIG. 2 provides a highly simplified example of a positioning architecture disclosing operational entities to determine a position of a mobile device, called herein a terminal device.

Referring to FIG. 2, the system 200 comprises, for positioning a terminal device (TD) 201, a plurality of apparatuses 202a, 202b configured to act as a transmission-reception point (TRP) and an apparatus 205 configured to determine a position of the terminal device. It should be appreciated that other apparatuses may be involved in the information exchange, for example information may pass via them, but for the sake of clarity they are not described in more detail herein.

The terminal device 201 is a device that may move and/or contain movable parts and is configured to communicate with a radio access network, at least as will be described in more detail below.

An apparatus 202a, 202b configured to act as a transmission-reception point, called herein a transmission-reception point, may be a base station or an access node, or an operational entity comprising one or more antennas in a base station, or an operational entity comprising one or more remote radio heads, or a remote antenna of a base station, or any other set of geographically co-located antennas forming one operational entity, for example an antenna array with one or more antenna elements, for one cell in the radio access network, or for a part of the one cell. In other words, one cell may include one or multiple transmission points, and cells in the radio access network comprise transmission-reception points. For positioning purposes the transmission-reception points are configured to transmit positioning reference signals 220, 220' to terminal devices, as will be described in more detail below.

The apparatus 205 configured to determine the position of the terminal device 201 may be an apparatus, or corresponding network node or network apparatus, or network entity, configured to act as location management point (LMP). The apparatus 205 may comprise a location management function for any positioning service (location service, service requiring position information on one or move movable entity), or any corresponding positioning management entity, to provide the location management point. The location management point (apparatus 205) may be configured to position the terminal device 201 in response to receiving a corresponding positioning request from a service (an apparatus running the service) requiring the position information. The positioning request may request continuous positioning, or discontinuous positioning, or one-off positioning of the terminal device. The apparatus 205 receives latency and accuracy positioning requirements from the service (apparatus running the service) that requested positioning of the terminal device. Further, the apparatus 205 is configured to have, or have access to, information on locations (positions) of the transmission-reception points. The position information of one or more transaction-reception points may be used when determining the position of the terminal device 201. The apparatus 205 may be an apparatus in the core network, configured to communicate (signal) directly, or via one or more other apparatuses, with terminal devices and transmission-reception points, as illustrated with signals 210, 211, 211', to exchange information relating to positioning of terminal devices, as will be described in more detail below.

Figure 3:
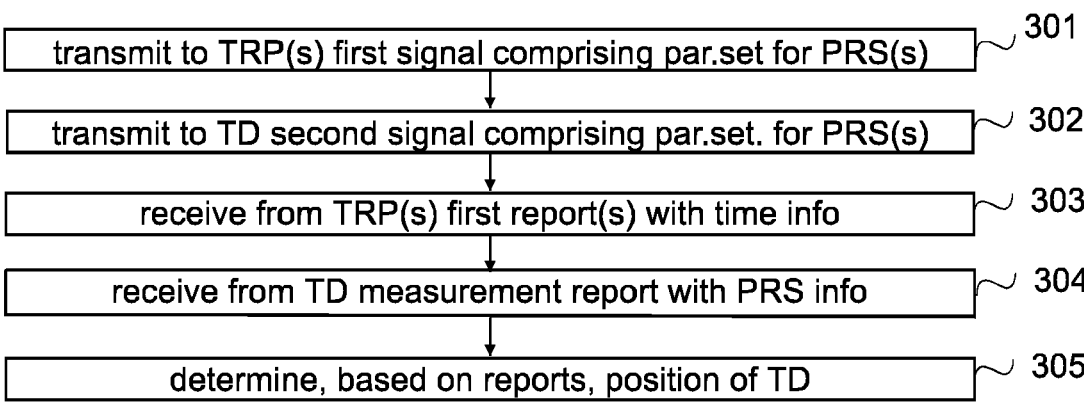
FIG. 3 is a flow charts illustrating an example functionality of an apparatus configured to determine positions.

FIG. 3 illustrates an example functionality of the apparatus configured to determine positions of terminal devices. The functionality may be an enhancement to a location management function defined for new radio (5G), for example.

Referring to FIG. 3, a first signal is transmitted in block 301 to at least one transmission-reception point. The first signal comprises a parameter setting for one or more positioning reference signal transmissions. The first signal may comprise a common resource pool comprising a plurality of parameter settings. In other words, the parameter setting may be comprised in the common resource pool. The parameter setting is a tuple that comprises parameters (parameter values) to generate a positioning reference signal. In other words, the parameter setting designates all parameters required to generate a positioning reference signal.

Further, a second signal is transmitted in block 302 to a terminal device to be positioned. (If more than one terminal device is to be positioned, more than one second signal may be transmitted). The second signal comprises the parameter setting. The second signal may comprise also other information. In other words, the parameter setting for one or more positioning reference signal (PRS) transmissions is transmitted in one or more first signals to one or more transmission-reception points (TRPs) and in one or more second signals to the terminal device (TD).

Then at least from one transmission-reception point, to which the first signal was transmitted in block 301, a first report is received in block 303. In other words, from one or more of the at least one transmission-reception points, one or more first reports are received in block 303. In the illustrated example, the first report comprises at least an occurrence time of a successful transmission of a positioning reference signal from said transmission-reception point (the transmission-reception point wherefrom the first report was received). In implementations in which a contention based access is used in positioning reference signal transmissions, the first report also indicates whether the transmission succeeded. An example of a contention based access is a listen-before-talk (LBT) technique, in which, when there is something to transmit from a device, the device senses radio resources before commencing a transmission. In other words, the transmission takes place when the device assumes that the radio resources are free. However, a collision may occur because another device may have sensed the radio resources as free and has also commenced a transmission.

Also from the terminal device a measurement report is received in block 304. A measurement report comprises information on positioning reference signals received by the terminal device. For example, the measurement report may comprise information on the reception of the position reference signal configured in the first signal(s), successful transmission of which may 4-10 be reported in the first report(s). The information on the reception of the positioning reference signal(s) may comprise one or more quality metrics, examples of which will be given below. Measurement reports may be received from one or more terminal devices, to position said one or more terminal devices.

Positions of terminal devices can be determined based on the received reports. More precisely, a position of the terminal device is determined in block 305 based on the received one or more first reports and the measurement report received from the terminal device.

Figure 4:
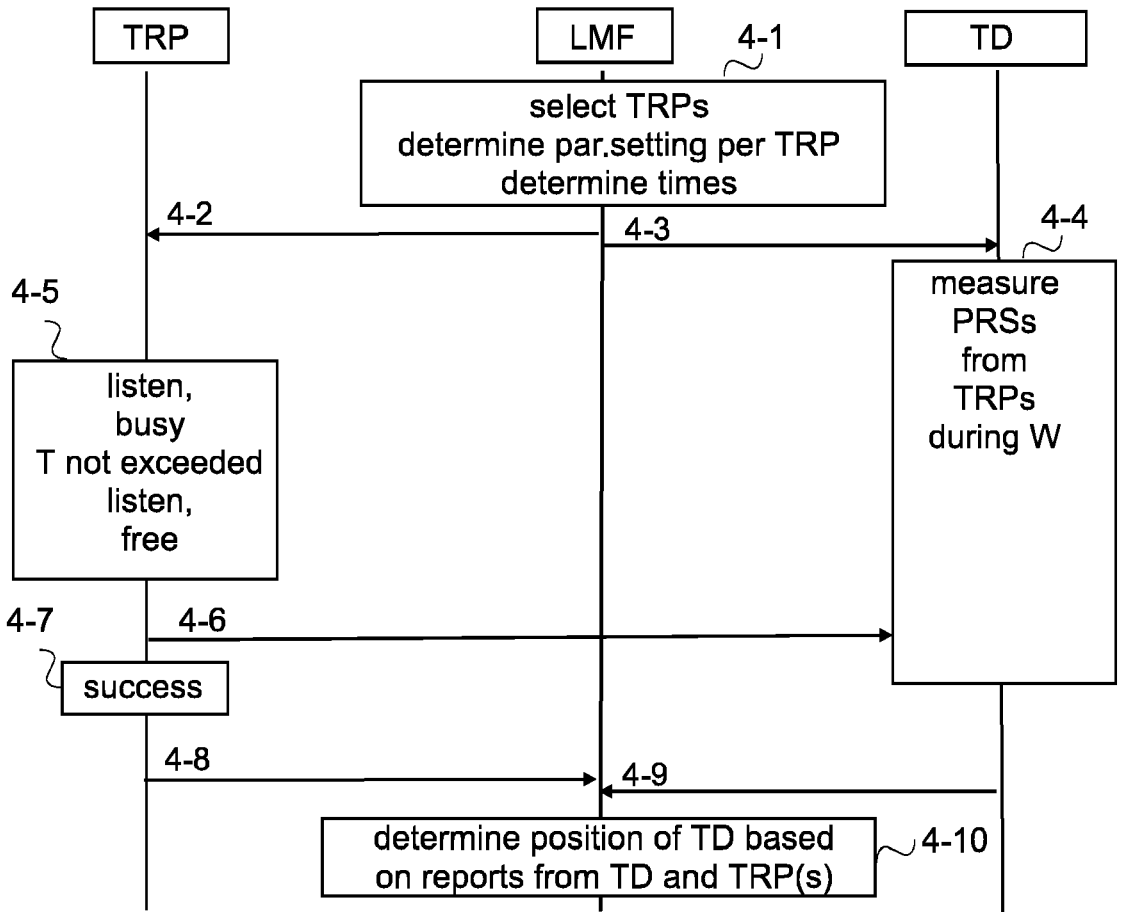
FIGS. 4 to 6 illustrate examples of information exchange.
Figures 5, 6:
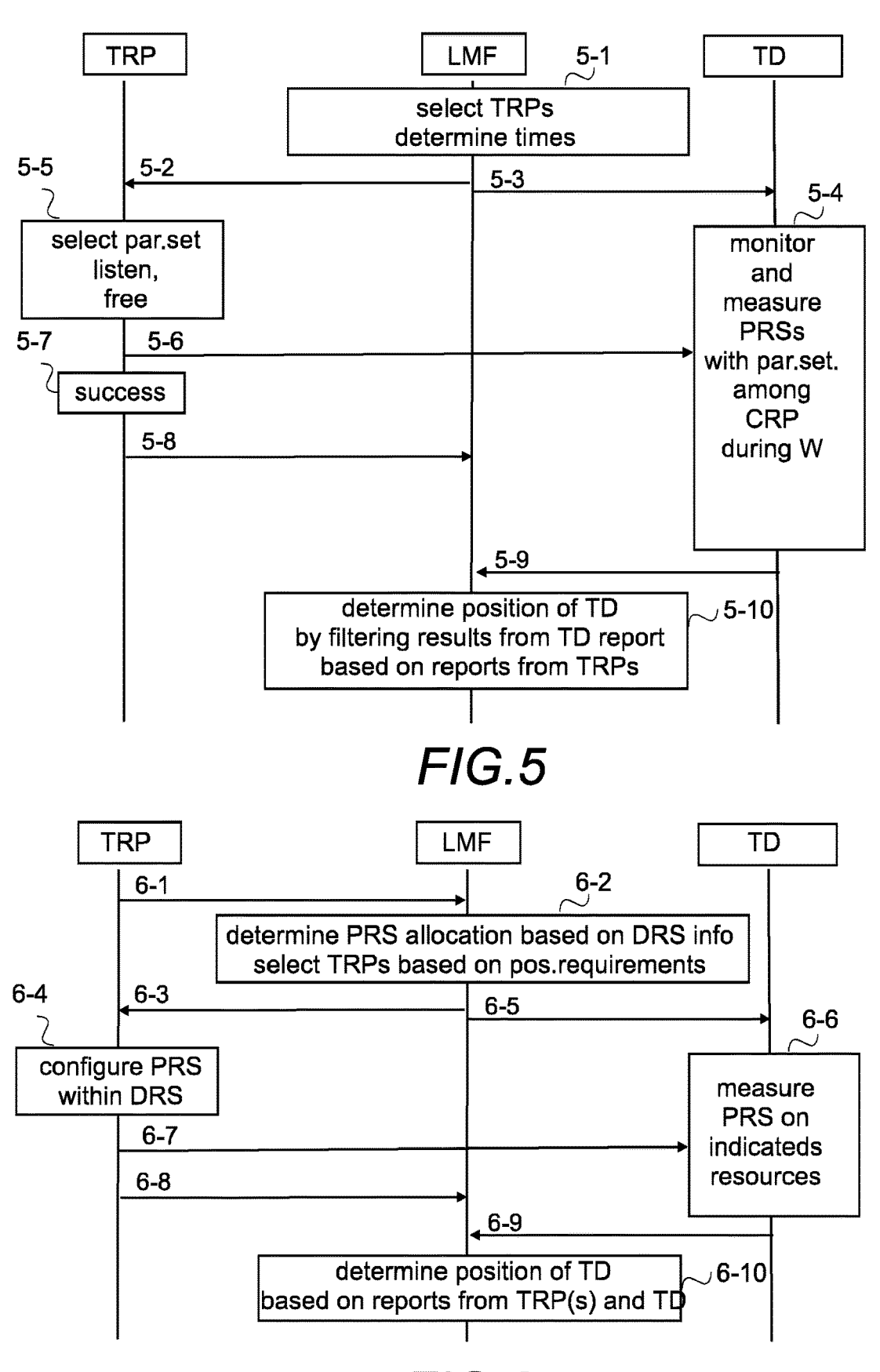

In the illustrated examples of FIGS. 4 to 6, one transmission-reception point TRP is depicted for the sake of clarity. However, it should be appreciated that to position a terminal device TD a plurality of transmission-reception points may be involved. Further, in the illustrated examples, the location management function LMF depicts a network entity (apparatus) configured to position terminal devices.

FIGS. 4 and 5 illustrate examples of information exchange in an implementation in which content based access is used for positioning reference signals transmitted from transmission-reception points.

Referring to FIG. 4, the LMF selects in block 4-1 a set of transmission-reception points for positioning a terminal device TD, and determines (assigns) in block 4-1, per a transmission-reception point selected, a parameter setting for positioning reference signal transmissions, and time information. For example, the parameter setting determined may be an individual parameter setting per a transmission-reception point, whereas the time information may be the same or different for the set of transmission-reception points. In the illustrated example, the time information include a retransmission timeout value for the contention based access and information indicating listening time for positioning reference signals, i.e. a length of a time period to listen to positioning reference signals. The length of the time period may be indicated as an observation window size. Its value is preferably bigger than the retransmission timeout value, to ensure that the terminal device listens possible retransmissions. In implementations using individual parameter settings, the individual parameter setting assigned to one transmission-reception point in the set of transmission reception points is different from parameter settings assigned to other transmission-reception points in the set of transmission-reception point. The individual parameter setting may be called a unique parameter setting. By assigning the individual parameter setting per the selected transmission point it is ensured that positioning reference signals transmitted from the selected transmission points do not collide with each other. The parameter setting may contain a code, which may be a sequence identifier, for example a numerical value selected from values {0, 1, . . . , 4095}. In addition or alternatively, the parameter setting may contain a comb, which defines positioning reference signal pattern in frequency (frequency domain), and/or repetition period, which defines positioning reference signal pattern in time (time pattern in time domain), and/or periodicity, which defines a time interval after which a positioning reference signal is transmitted (sent) again, and/or a spatial pattern, for example an antenna/beam index to cover all possible frequencies. The time pattern may be defined as a time offset expressed in number of symbols from the start of a subframe and a number of repetitions.

Then first signals (depicted by message 4-2) are transmitted to the selected transmission-reception points, a first signal comprising the parameter setting and the retransmission timeout value. Further, one or more second signals (depicted by message 4-3) are transmitted to the terminal device. Depending on an implementation, the number of second signals that are transmitted may be equal to the number of first signals transmitted, in which case a second signal comprises one parameter setting and the length of the time period (observation window size). In another implementation a second signal may comprise two or more parameter settings and the length of the time period, resulting that the number of transmitted second signals is less than the number of transmitted first signals. Further, in an implementation the second signal may comprise information on one or more quality metrics to report. In another implementation the terminal device is preconfigured to report one or more quality metrics as a response to the second signal. The one or more quality metrics indicate a likelihood of a collision. Examples of the quality metrics are given below.

A first signal may be a message according to a new radio positioning protocol annex. It may be called for example an listen-before-talk positioning reference signal identifier message.

A second signal may be an assistance message, for example an assistance message according to long term evolution positioning protocol.

In the illustrated example, the terminal device starts to monitor, i.e. to listen and measure, in block 4-4 positioning reference signals having the parameter setting(s) received in the one or more second signals, the positioning reference signals being transmitted by transmission-reception points. The listening and measuring continues the length of the time period W received in the one or more second signals.

In the meantime the transmission-reception point listens (senses) in block 4-5 the radio resources, deems the radio resource, for example a channel, either free or busy. In case the radio resource is deemed to be busy, the transmission-reception point backs off transmitting, as is known in the LBT technology, checks whether a timeout timer has reached the retransmission timeout value T received in the first signal. If not, as it is assumed in the illustrated example, the transmission-reception point continues the sensing, and deems, before the retransmission timeout value T is exceeded, the radio resource as free and transmits (sends) a positioning reference signal (message 4-6) according to the received individual parameter setting. The transmitting indicates to the transmission-reception point a success (block 4-7) of the transmission, and a first report (message 4-8) is transmitted to the location management function. In this case the first report indicates a successful transmission of the positioning reference signal. The first report may indicate that transmitting of the positioning reference signal succeeded, for example by a corresponding flag. The first report indicates at least the occurrence time of the successful transmission, for example as a timestamp indicating the occurrence time. Further, the first report may contain the parameter setting received in message 4-2. The first report may be a message according to the new radio positioning protocol annex.

In case the retransmission timeout value T is exceeded before the radio resource is deemed to be free, the first report indicates a failure, for example by a corresponding flag, and the first report does not contain the occurrence time of a successful transmission.

When the terminal device has listened positioning reference signals the time period of length W (the occurrence window) and measured detected positioning reference signals, it transmits a measurement report (message 4-9) to the location management function. The measurement report comprises, per a detected positioning reference signal, one or more quality metrics. The quality metric may be a signal to interference plus noise ratio (SINR), and/or a reference signal received power (RSRP), etc. The quality metrics to be included to the measurement report may be indicated in message 4-3 (second signal) and/or the terminal device may be preset (preconfigured) to report certain quality metrics of received (detected) positioning reference signals. In addition to the one or more quality metrics, also other metrics, like angle of arrival (AoA), time of arrival (ToA), reference signal time difference (RSTD), etc., per a detected positioning reference signal, may be included to the measurement report. A parameter setting may be used in the measurement report to identify sources of the detected positioning reference signal, and thereby also a transmission-reception point which transmitted the detected positioning reference signal. The transmission of the measurement report may be scheduled.

The location management function determines in block 4-10 the position of the terminal device based on the measurement report received from the terminal device and based on one or more first reports, which indicate successful transmissions, received from corresponding one or more transmission-reception points. The location management function may determine (estimate) the position of the terminal device using the reports and position information of the transmission-reception points and a position estimation method. A non-limiting list of position estimation methods include multi-lateration methods, fingerprinting methods and Kalman filtering.

The determining includes the location management function assessing, using the one or more quality metrics per a detected positioning reference signal, whether and/or how the reported measurement of the detected positioning reference signal will be used in the position estimation. For example, if the reception of the positioning reference signal in the terminal device is interfered by another signal transmission, as a result of a transmission collision, this should be reflected in the quality metrics values in the measurement report, and the location management function may be configured to discard the respective measurement results when determining the position, and/or to use a lower weight for the respective measurement results when determining the position. This increase accuracy of the positioning, since corrupted results caused by interfered transmissions are detected and processed differently than non-interfered transmissions.

Further, the location management function uses the timestamps, or corresponding time information (i.e. occurrence time), to distinguish transmission offset and a propagation delay. For example a timestamp in a first report from a transmission-reception point may be used to subtract a delayed transmission offset from a corresponding time of arrival in the measurement report.

FIG. 5 illustrates another example. In the illustrated example the location management function minimizes the transmission-reception points coordination by not assigning a parameter setting per a transmission-reception point (for example by not assigning individual parameter settings) but letting the transmission-reception points to select a parameter setting from a common resource pool comprising a plurality of parameter settings.

Referring to FIG. 5, the LMF selects in block 5-1 a set of transmission-reception points for positioning a terminal device TD, and determines in block 5-1 time information, as described above with block 4-1, the only exception being that no (individual) parameter setting is assigned. Then first signals (depicted by message 5-2) are transmitted to transmission-reception points in the set of transmission-reception points, a first signal comprising the content of the common resource pool, i.e. the plurality of the parameter settings, and the retransmission timeout value. Further, one or more second signals (depicted by message 5-3) are transmitted to the terminal device, the one or more second signals differing from the ones described with FIG. 4 in that respect that the content of the common resource pool is transmitted in message 5-3 instead of assigned (individual) parameter settings.

In the illustrated example, the terminal device starts to monitor, i.e. to listen and measure, in block 5-4 positioning reference signals having a corresponding parameter setting in the common resource pool, the positioning reference signals being transmitted by transmission-reception points. The listening and measuring, i.e. the monitoring, continue the length of the time period W received in the one or more second signals. In other words, the terminal device tests the common resource pool (CRP) by trying to detect which of the location positioning signals defined by means of the plurality of the parameter settings in the common resource pool (CRP) have been actually transmitted.

In the meantime a transmission-reception point selects in block 5-5 one parameter setting from the common resource pool, listens (senses) in block 5-5 the radio resources, deems the radio resource either free or busy, as described above. The transmission-reception point may be configured to perform the selection randomly. In the illustrated example it is assumed that the radio resource is free, and a location reference signal is transmitted according to the parameter setting selected. The transmitting indicates to the transmission-reception point a success (block 5-7) of the transmission, and a first report (message 5-8) is transmitted to the location management function. The first report may indicate a successful transmission of the positioning reference signal, for example by a corresponding flag. The first report indicates the occurrence time of the successful transmission, for example as a timestamp indicating the occurrence time. Further, the first report contains the parameter setting selected in block 5-5. The first report may be a message according to the new radio positioning protocol annex.

In case the retransmission timeout value T is exceeded before the radio resource is deemed to be free, the first report indicates a failure, for example by a corresponding flag, and the first report does not contain the occurrence time of the transmission, but depending on an implementation it may or may not contain the selected parameter setting.

When the terminal device has listened positioning reference signals the time period of length W (the occurrence window) and measured detected positioning reference signals, it transmits a measurement report (message 5-9) to the location management function, as is described above with FIG. 4. The detected one or more positioning reference signals may be indicated by adding to the measurement report corresponding parameter settings detected.

The location management function determines in block 5-10 the position of the terminal device based on the measurement report received from the terminal device and based on one or more first reports. In the illustrated example, the location management function is configured to filter colliding positioning reference signals using the first reports. If two or more first reports indicate success and contain the same parameter setting, a collision has most probably occurred, and measurement results in the measurement report that are associated with colliding positioning reference signals (having the same parameter setting) are discarded (filtered away) from the measurement report in block 5-10, and the position of the terminal device is determined after that. For example, any known method to determine the position may be used, as explained above with FIG. 4. Thanks to filtering, the position is determined using non-corrupted measurement result(s,) i.e. measurement results on positioning reference signal transmission(s) that did not collide.

In the example of FIG. 6, positioning reference signals are transmitted using the content based access within a discovery reference signal (DRS) period. A discovery reference signal is configured with a transmission periodicity for synchronization and channel state information measurements. In 5G and beyond, the discovery reference signal is a set of signals that comprises, for example, primary and secondary synchronization signals, a channel state information reference signal, a paging signal and many more.

Referring to FIG. 6, transmission-reception points are configured to report (message 6-1) to the location management function their discovery reference signal configurations, a transmission-reception point its own discovery reference signal configuration, which comprises information on a discovery reference signal periodicity, i.e. a discovery signaling period, and a window length (time to monitor). Message 6-1 may be a message according to the new radio positioning protocol annex.

The location management function is configured to collect in block 6-2 from the received discovery reference signal configurations, i.e. from the received discovery reference signal information, the periodicities (periods) and window lengths. The location management function is further configured to determine resource allocation for position reference signals based on the collected information, for example per a transmission-reception point. The periodicity determined for a position reference signal for a transmission-reception point may be equal to the periodicity of the discovery reference signal, or a multiple number of the periodicity of the discovery reference signal. The location management function is further configured to check/evaluate whether the latency and accuracy positioning requirements for the terminal device allow the positioning reference signals to be bundled in the discovery reference signal period of each transmission-reception point. Based on the results of said evaluation, i.e. based on positioning requirements for the terminal device, the location management function selects a set of transmission-reception points. The transmission-reception points selected to the set allow the positioning reference signals to be bundled in the discovery signaling period (discovery reference signal period), or multiple of the discovery signaling periods, as decided by the location management function. In other words, the positioning reference signal will be one signal in the set of discovery reference signals. If the positioning reference signals are to be transmitted with a shorter period than a discovery signaling period of a transmission-reception point, or earlier than what the discovery reference signal period is able to offer, the location management function is configured not to select the transmission-reception point to the set.

Then first signals (depicted by message 6-3) are transmitted to selected transmission-reception points, a first signal requesting the transmission-reception point to configure positioning reference signal transmissions in the discovery signaling period according to the allocation. Message 6-3 may comprise, as the parameter setting for positioning reference signal transmissions, the sequence identifier, or a corresponding code, and, as the time information, a slot offset in the dynamic reference signal window in the discovery reference signal configurations. Message 6-3 may also comprise the comb (positioning reference signal pattern in frequency), and/or repetition period (positioning reference signal pattern in time) and/or periodicity mapped to the discovery reference signal periodicity. Message 6-3 may be a message according to the new radio positioning protocol annex.

The transmission-reception point configures in block 6-4 its positioning reference signal transmissions to occur within dynamic reference signal transmission according to the configuration received in message 6-3.

Further, one or more second signals (depicted by message 6-5) are transmitted to the terminal device, the second signal(s) comprising corresponding allocation information for positioning reference signal transmissions as message 6-3 comprises. Message 6-5 comprises at least the sequence identifier, or the corresponding code, per a selected transmission-reception point and the slot offset. The second signal (message 6-5) may be an assistance message, for example an assistance message according to long term evolution positioning protocol.

In the illustrated example, the terminal device starts to conduct the discovery reference signal reception, covering all signals in the set of signals. The conducting includes that the terminal devices starts also to listen and measure, i.e. to monitor, in block 6-6 positioning reference signals allocation. The listening and measuring continues the length of the time period defined for dynamic reference signals, and will be repeated according to the dynamic reference signal configuration.

When a transmission occasion for the positioning reference signal is detected, in other words the resources are sensed and deemed free at allocated transmission occasion, as described above with FIG. 4, transmission of the positioning reference signal (message 6-7) takes place, and a first report (message 6-8) indicating success of the transmission and containing information on the transmission time, for example a timestamp, is transmitted, as described above with FIG. 4. Message 6-8 may be a message according to the new radio positioning protocol annex. In a new radio-based access to unlicensed spectrum (NR-U) discovery reference signal framework message 6-8 (the positioning reference signal, PRS) may be called NR-U PRS and in a licensed assisted access (LAA) discovery reference signal framework message 6-8 may be called LAA PRS.

When the terminal device has listened and measured positioning reference signals, as well as other signals transmitted as dynamic reference signals, the time period defined for the dynamic reference signals and measured detected positioning reference signals, it transmits a measurement report (message 6-9) to the location management function, as is described above with FIG. 4. It should be appreciated that depending on the bundling, it may be that not all messages 6-9 contain information on positioning reference signals. For example, if the periodicity of dynamic reference signals is 2 ms and the periodicity of the positioning reference signal transmissions is 6 ms, then every third message 6-7 will contain positioning reference signals, and correspondingly every third message 6-9 will contain measurement results on positioning reference signals.

The location management function determines in block 6-10 the position of the terminal device based on the measurement report received from the terminal device and based on one or more first reports, which indicate success, received from corresponding one or more transmission-reception points, as is described above with FIG. 4.

By disseminating information to transmission-receptions points, in addition to the location management function and the terminal device, a way to position a terminal device without requiring traditional resource allocation with frame number information is disclosed. Further, the information conveyed in the signals minimizes risk of positioning the terminal device using measurements corrupted by interference due to collisions, and thereby allows accurate positioning in contention based access.

The blocks, related functions, and information exchanges described above by means of FIGS. 2 to 6 are in no absolute chronological order, and some of them may be performed simultaneously or in an order differing from the given one. Other functions can also be executed between them or within them, and other information may be transmitted, and/or other rules applied or selected. Some of the blocks or part of the blocks or one or more pieces of information can also be left out or replaced by a corresponding block or part of the block or one or more pieces of information.

Figure 7:
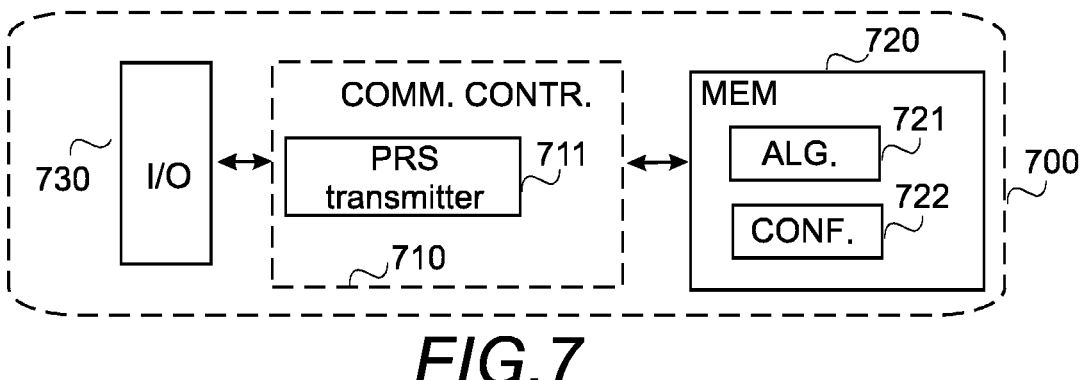
FIGS. 7 to 9 are schematic block diagrams.
Figure 8:
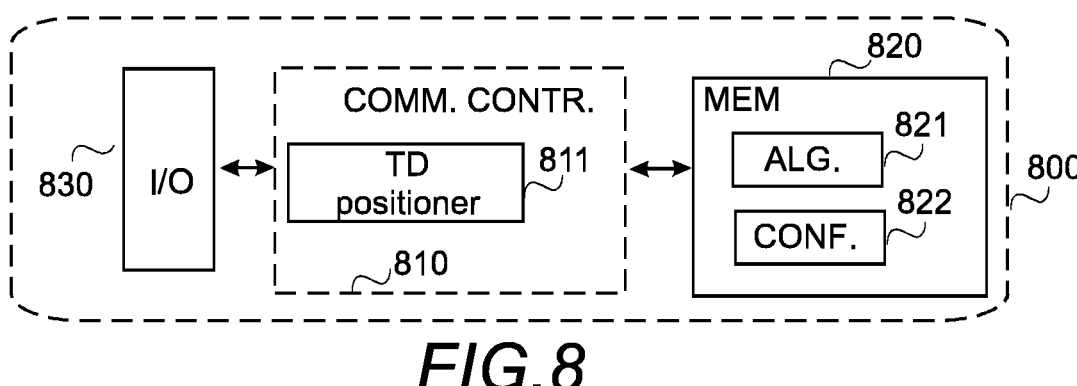
Figure 9:
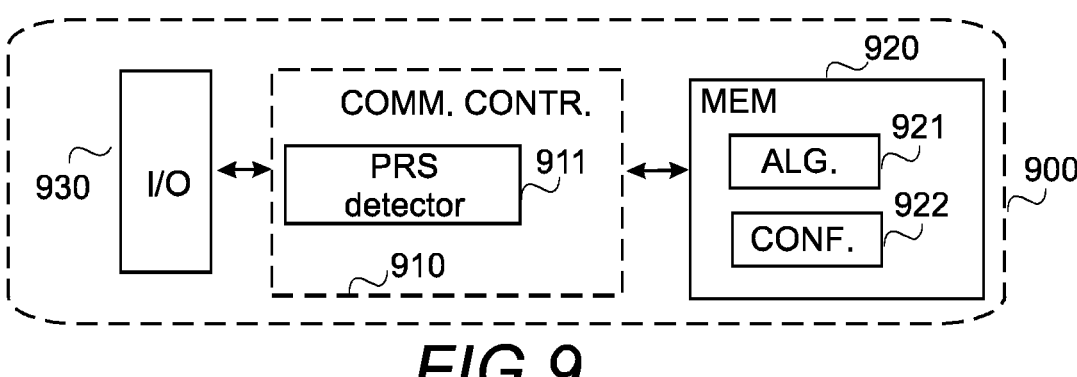

FIGS. 7, 8, and 9 illustrate apparatuses comprising a communication controller 710, 810, 910 such as at least one processor or processing circuitry, and at least one memory 720, 820, 920 including a computer program code (software, algorithm) ALG. 721, 821, 921, wherein the at least one memory and the computer program code (software, algorithm) are configured, with the at least one processor, to cause the respective apparatus to carry out any one of the embodiments, examples and implementations described above. FIG. 7 illustrates an apparatus configured to provide a transmission-reception point, configurable by apparatus in FIG. 8 to transmit positioning reference signals, or corresponding signals, FIG. 8 illustrates an apparatus (a network apparatus) configured to provide location management point (location management function), or any corresponding apparatus, suitable for positioning terminal devices and for configuring apparatuses in FIGS. 7 and 9 for positioning, and FIG. 9 illustrates an apparatus to be positioned, and to report measurements as configured by apparatus in FIG. 8. The apparatuses of FIGS. 7, 8 and 9 may be electronic devices, examples being listed above with FIGS. 1 and 2.

Referring to FIGS. 7, 8 and 9, the memory 720, 820, 920 may be implemented using any suitable data storage technology, such as semiconductor based memory devices, flash memory, magnetic memory devices and systems, optical memory devices and systems, fixed memory and removable memory. The memory may comprise a configuration storage CONF. 721, 821, 921, such as a configuration database, for at least storing positioning reference signal related information and/or configurations, such as one or more parameter settings. The memory 720, 820, 920 may further store a data buffer for data waiting to be processed (including transmission).

Referring to FIG. 7, the apparatus, for example a gNB or an access point, comprises a communication interface 730 comprising hardware and/or software for realizing communication connectivity according to one or more wireless and/or wired communication protocols. The communication interface 730 may provide the apparatus with radio communication capabilities, as well as communication capabilities towards a wired network. For example, the communication interface 730 may provide the apparatus 700 with communication capabilities with the apparatus of FIG. 8 and the apparatus of FIG. 9.

Digital signal processing regarding transmission and reception of signals may be performed in a communication controller 710. The communication interface may comprise standard well-known components such as an amplifier, filter, frequency-converter, (de)modulator, and encoder/decoder circuitries and one or more antennas.

The communication controller 710 comprises a positioning reference signal processing circuitry 711 (PRS transmitter) configured to receive at least a parameter setting and to transmit positioning reference signals as configured according to any one of the embodiments/examples/implementations described above. The communication controller 710 may control the positioning reference signal processing circuitry 711 and/or related timers. Further, the communication controller 710 may control information exchange according to a corresponding configuration.

In an embodiment, at least some of the functionalities of the apparatus of FIG. 7 may be shared between two physically separate devices, forming one operational entity. Therefore, the apparatus may be seen to depict the operational entity comprising one or more physically separate devices for executing at least some of the processes described with respect to the transmission-reception point.

Referring to FIG. 8, the apparatus, for example location management point, comprises a communication interface 830 comprising hardware and/or software for realizing communication connectivity according to one or more wireless and/or wired communication protocols. The communication interface 830 may provide the apparatus with radio communication capabilities, as well as communication capabilities with a wired network. For example, the communication interface 830 may provide the apparatus 800 with communication capabilities with the apparatus of FIG. 7 and the apparatus of FIG. 9.

Digital signal processing regarding transmission and reception of signals may be performed in a communication controller 810. The communication interface may comprise standard well-known components such as an amplifier, filter, frequency-converter, (de)modulator, and encoder/decoder circuitries and one or more antennas.

The communication controller 810 comprises a device positioning processing circuitry 811 (TD positioner) configured to configure transmission-reception points with positioning reference signals configuration(s) (parameter setting(s)), to inform terminal devices correspondingly and to position terminal devices according to any one of the embodiments/examples/implementations described above. The communication controller 810 may control the device positioning processing circuitry 811. Further, the communication controller 810 may control information exchange.

In an embodiment, at least some of the functionalities of the apparatus of FIG. 8 may be shared between two physically separate devices, forming one operational entity.

Therefore, the apparatus may be seen to depict the operational entity comprising one or more physically separate devices for executing at least some of the processes described with respect to the network apparatus and/or location management point.

Referring to FIG. 9, the apparatus 900 may further comprise a communication interface 930 comprising hardware and/or software for realizing communication connectivity according to one or more communication protocols. The communication interface 930 may provide the apparatus 900 with communication capabilities with the apparatus of FIG. 7 and the apparatus of FIG. 8. The communication interface may comprise standard well-known analog components such as an amplifier, filter, frequency-converter and circuitries, and conversion circuitries transforming signals between analog and digital domains. Digital signal processing regarding transmission and reception of signals may be performed in a communication controller 910.

The communication controller 910 comprises a positioning reference signal processing circuitry 911 (PRS detector) configured to detect (measure) and report positioning reference signals according to any one of the embodiments/examples/implementations described above. The positioning reference signal processing circuitry 911 may be configured to detect (measure) and report positioning reference signals according to any one of the embodiments/examples/implementations described above. The communication controller 910 may control the positioning reference signal processing circuitry 911. Depending on an implementation, one or more timers may be controlled by the communication controller 910 and/or by the positioning reference signal processing circuitry 911.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 3 to 6 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments/examples comprises a circuitry including at least one processor and at least one memory including computer program code. When activated, the circuitry causes the apparatus to perform at least some of the functionalities according to any one of the embodiments/examples/implementations of FIGS. 2 to 6, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the apparatuses (nodes) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus, comprising:
at least one processor; and at least one memory including computer program code, the at least one memory and computer program code configured to, with the at least one processor, cause the apparatus at least to:
transmit to a transmission-reception point of at least one transmission-reception point a first signal comprising a parameter setting for one or more positioning reference signal transmissions;
transmit to a terminal device a second signal comprising at least the parameter setting;
receive, from the transmission-reception point, a first report comprising at least an occurrence time of a successful transmission of a positioning reference signal from the transmission-reception point;
receive, from the terminal device, a measurement report comprising information on at least the positioning reference signal; and
determine, based on at least the first report and the measurement report, a position of the terminal device,
wherein the at least one memory and computer program code configured to, with the at least one processor, cause the apparatus further at least to:
indicate in the first signal, that a contention based access is to be used for the one or more positioning reference signal transmissions, and a retransmission timeout value for the contention based access; and
indicate in the second signal a length of a time period to listen to at least the one or more positioning reference signal transmissions.

2. The apparatus of claim 1, wherein the at least one memory and computer program code configured to, with the at least one processor, cause the apparatus further at least to:
select amongst a plurality of transmission-reception points a set of transmission-reception points;
assign a parameter setting per a selected transmission-reception point in the set of transmission reception points;
transmit, per the selected transmission-reception point, to the selected transmission-reception point, in the first signal the parameter setting assigned as the parameter setting for one or more positioning reference signal transmissions; and
transmit in the second signal, to the terminal device, the parameter settings assigned to the set of selected transmission-reception points.

3. The apparatus of claim 1, wherein the at least one memory and computer program code configured to, with the at least one processor, cause the apparatus further at least to:
select amongst a plurality of transmission-reception points a set of transmission-reception points;
transmit, per the selected transmission-reception point, to the selected transmission-reception point, in the first signal, a common resource pool comprising a plurality of parameter settings including the parameter setting; and
transmit in the second signal, to the terminal device, the common resource pool.

4. The apparatus of claim 1, wherein the at least one memory and computer program code configured to, with the at least one processor, cause the apparatus further at least to:

determine, based on at least one discovery reference signal configuration received from the at least one transmission-reception point, resource allocation for the one or more positioning reference signal transmissions, wherein a discovery reference signal configuration received indicates a discovery signaling period and wherein the resource allocation at least indicates how many discovery signaling periods a periodicity of the one or more positioning reference signal transmissions is;

transmit in the first signal the resource allocation; and transmit in the second signal information indicating the resource allocation.

5. The apparatus of claim 1, wherein the parameter setting for one or more positioning reference signal transmissions comprises a sequence identifier and/or a frequency pattern of the positioning reference signal and/or a positioning reference pattern in time and/or a periodicity of the positioning reference signal and/or a spatial pattern.

6. The apparatus of claim 1, wherein the first signal and the first report are signals according to a new radio positioning protocol annex;

wherein the second signal is a signal according to a long term evolution positioning protocol; and wherein the apparatus is a network entity.

7. An apparatus, comprising:

at least one processor; and at least one memory including computer program code, the at least one memory and computer program code configured to, with the at least one processor, cause the apparatus at least to:

receive, from a network entity, a first signal comprising a parameter setting for one or more positioning reference signal transmissions;

transmit at least one positioning reference signal using the parameter setting received; and transmit to the network entity, in response to a successful transmission of a positioning reference signal, a first report comprising at least an occurrence time of the successful transmission of the positioning reference signal, wherein the at least one memory and computer program code configured to, with the at least one processor, cause the apparatus further at least to:

use a contention based access to transmit the at least one positioning reference signal; and repeat, in response to an unsuccessful positioning reference signal transmission, transmitting the at least one positioning reference signal using the parameter setting received until the number of transmissions meets a retransmission timeout value received in the first signal or a transmission succeeds, whichever occurs first.

8. The apparatus of claim 7, wherein the at least one memory and computer program code configured to, with the at least one processor, cause the apparatus further at least to:

select the parameter setting for the one or more positioning reference signal transmissions from a common resource pool comprising a plurality of parameter settings, the common resource pool being received in the first signal; and use the parameter setting selected as the parameter setting received when transmitting the at least one positioning reference signal.

9. The apparatus of claim 7, wherein the at least one memory and computer program code configured to, with the at least one processor, cause the apparatus further at least to:

transmit information on a discovery reference signal configuration to the network entity for obtaining scheduling information for the at least one positioning reference signal;

receive in the first signal also information on a resource allocation as the scheduling information; and transmit the at least one positioning reference signal according to the received resource allocation.

10. The apparatus of claim 7, wherein the first signal and the first report are signals according to a new radio positioning protocol annex, and wherein a second signal is a signal according to a long term evolution positioning protocol.

11. The apparatus of claim 7, wherein the apparatus is a transmission-reception point.

12. An apparatus, comprising at least one processor; and at least one memory including computer program code, the at least one memory and computer program code configured to, with the at least one processor, cause the apparatus at least to:

receive from a network entity at least a second signal comprising at least one parameter setting for one or more positioning reference signal transmissions from at least one transmission-reception point;

monitor the one or more positioning reference signal transmissions; and transmit to the network entity a measurement report comprising information on at least one positioning reference signal received by the apparatus from the one or more positioning reference signal transmissions, wherein the at least one memory and computer program code configured to, with the at least one processor, cause the apparatus further at least to:

use a contention based access to transmit the at least one positioning reference signal; and repeat, in response to an unsuccessful positioning reference signal transmission, transmitting the at least one positioning reference signal using the parameter setting received until the number of transmissions meets a retransmission timeout value received in the first signal or a transmission succeeds, whichever occurs first.

13. The apparatus of claim 12, wherein the at least one memory and computer program code configured to, with the at least one processor, cause the apparatus further at least to:

monitor, in response to the second signal comprising an observation time value, the one or more positioning reference signal transmissions during a time period having a length corresponding to the observation time value.

14. The apparatus of claim 12, wherein the at least one memory and computer program code configured to, with the at least one processor, cause the apparatus further at least to:

monitor, in response to a common resource pool comprising a plurality of parameter settings being received in the second signal as the parameter setting for the one or more positioning reference signal transmissions, which of the parameter settings in the common resource pools are detected by receiving, per a detected parameter setting, a corresponding positioning reference signal; and transmit in the measurement report, as the information on one or more positioning reference signals received by the apparatus, information on one or more detected parameter settings.

15. The apparatus of claim 12, wherein the at least one memory and computer program code configured to, with the at least one processor, cause the apparatus further at least to:

receive in the second signal also scheduling information for monitoring; and perform the monitoring according to the scheduling information.

16. The apparatus of claim 12, wherein the second signal is a signal according to a long term evolution positioning protocol.

17. The apparatus of claim 12, wherein the parameter setting for one or more positioning reference signal transmissions comprises a sequence identifier and/or a frequency pattern of the positioning reference signal and/or a positioning reference pattern in time and/or a periodicity of the positioning reference signal and/or a spatial pattern.

18. The apparatus of claim 12, wherein the apparatus is a terminal device.

* * * * *